Aug. 9, 1960 L. W. BEDKER 2,948,160
SLIDE
Filed May 3, 1956 3 Sheets-Sheet 1
FIG.2. FIG.I.
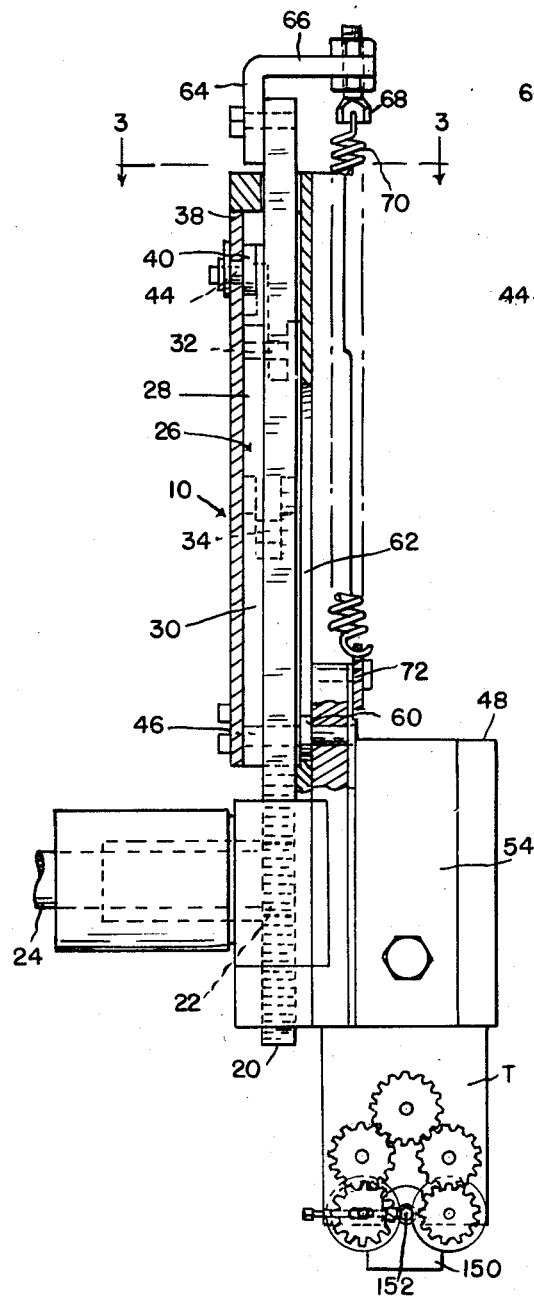
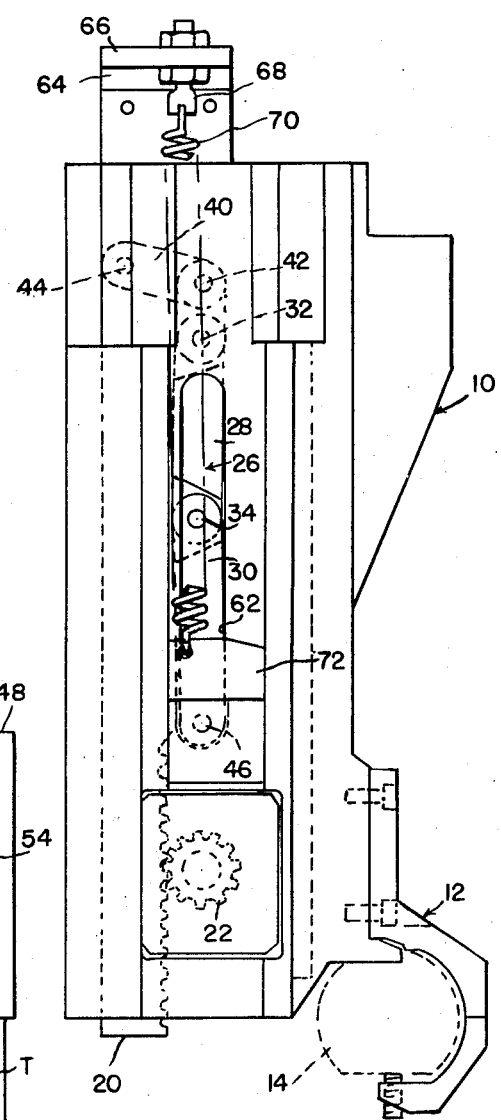
INVENTOR.
LEO W. BEDKER
BY
*Whittemore, Hulbert & Belknap*
ATTORNEYS

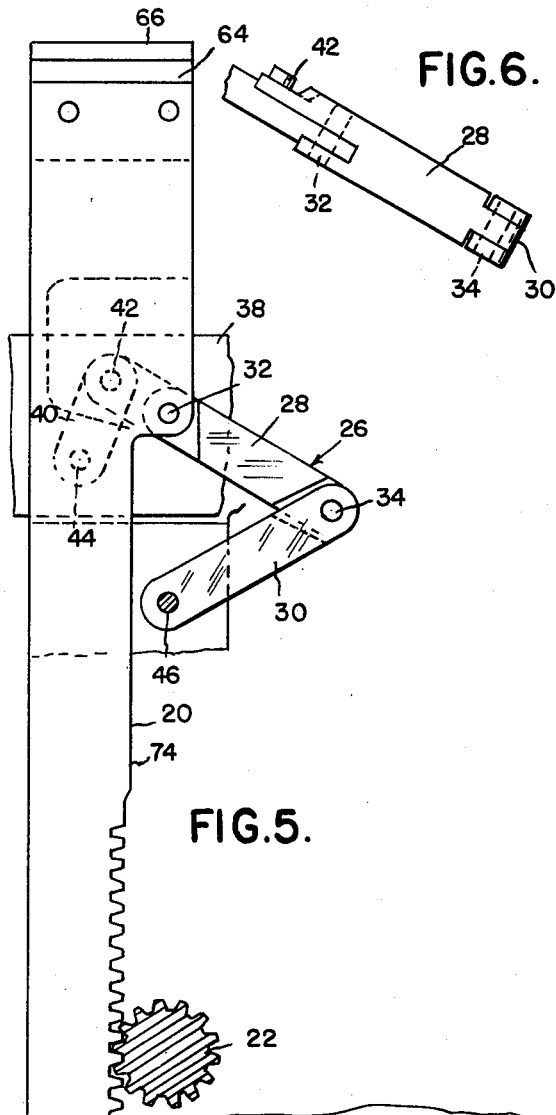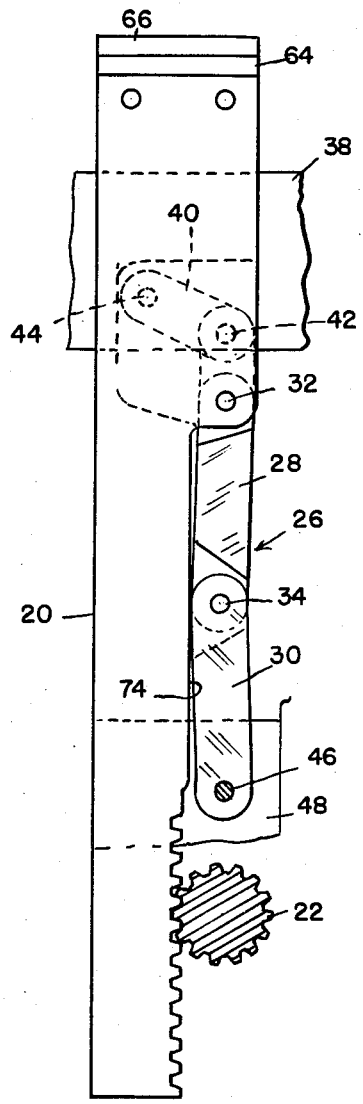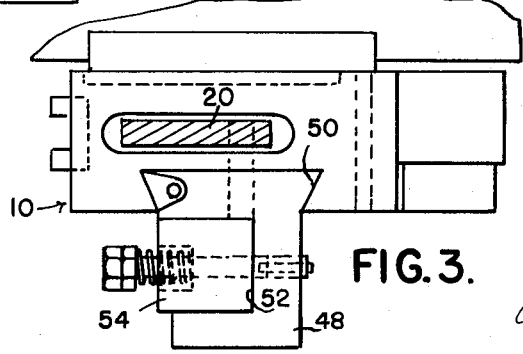

Aug. 9, 1960   L. W. BEDKER   2,948,160
SLIDE
Filed May 3, 1956   3 Sheets-Sheet 3
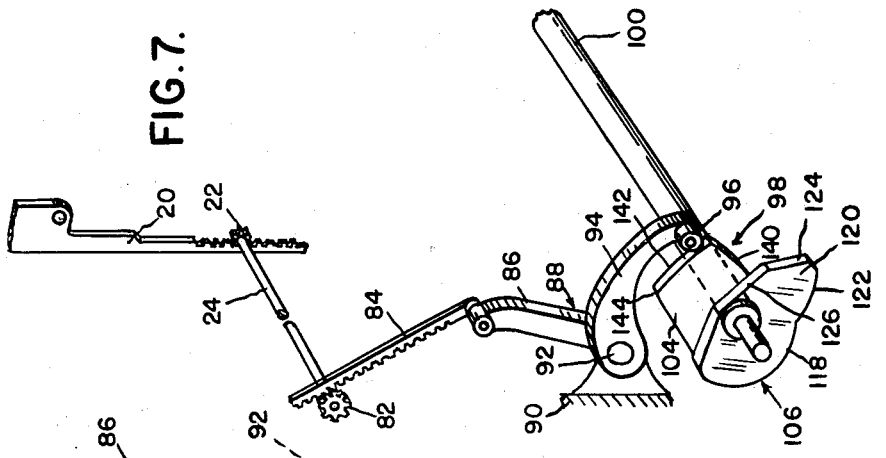
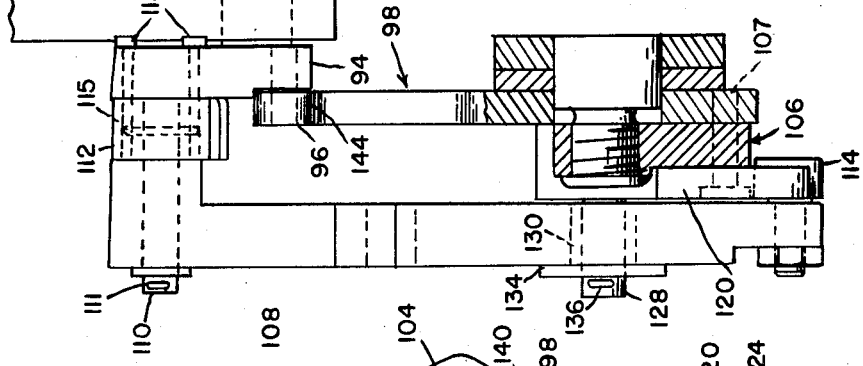
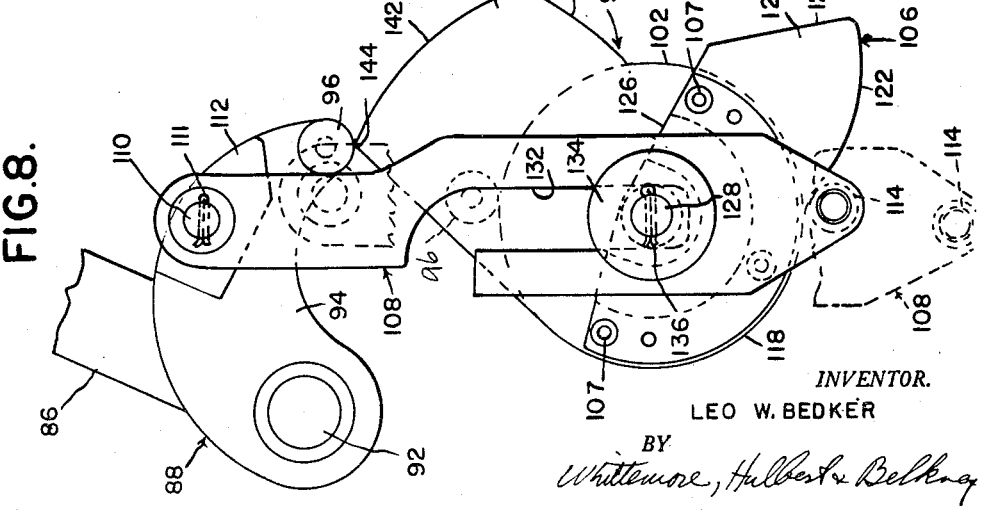
INVENTOR.
LEO W. BEDKER
BY
Whittemore, Hulbert & Belknap
ATTORNEYS

United States Patent Office 2,948,160
Patented Aug. 9, 1960

2,948,160

SLIDE

Leo W. Bedker, 21015 Beaconsfield, East Detroit, Mich.

Filed May 3, 1956, Ser. No. 582,569

2 Claims. (Cl. 74—110)

The present invention relates to a machine tool slide.

It is an object of the present invention to provide a machine tool, actuating means for a slide thereon characterized by its ability to provide an exceptionally long stroke and for controlling the speed of movement of the slide during its stroke so as to provide maximum available power during the working portion of the stroke.

More specifically, it is an object of the present invention to provide an attachment for a machine tool having a slide, an actuator movable in parallel relation with the slide, the attachment comprising a toggle device for connecting the actuator and slide, and means for breaking the toggle device during movement of the actuator in one direction and straightening the toggle device during movement of the actuator in the opposite direction.

More specifically, it is an object of the present invention to provide structure as defined in the preceding paragraph in which the means for breaking the toggle device is constructed and arranged to retain the toggle device in straightened condition during the working portion of the stroke of the machine slide.

It is a further object of the present invention to provide an attachment for a machine tool designed to increase the stroke of a machine slide thereon.

Another object of the invention is to provide means for moving a tool slide toward a work support to a predetermined position, and means for initiating movement of the tool slide away from the work support substantially at the instant the tool slide reaches the said predetermined position during its movement toward the work support.

In this connection, the invention is particularly applicable to thread rolling apparatus in which the thread forming rolls are supported on the tool slide, and in which the work support is adapted to support a round work piece which is rotated under power. As the tool slide is moved toward the work support, the thread forming rolls engage the work piece and are pressed thereagainst under a considerable pressure so that the thread forming rolls are rotated by reason of their frictional engagement with the rotating work piece. It is extremely important that there be no slippage between the thread forming rolls and the work piece, and during the forward movement of the tool slide there will be no slippage since during this time the forming rolls are held against the work piece under a relatively high pressure. However, there is a tendency for the forming rolls to slip relative to the work piece at the end of the forward stroke since the pressure is removed at this instant, unless the tool slide is immediately backed away from the work support as soon as the forward advance thereof is completed.

Other objects of the invention will become apparent as the foregoing description proceeds, especially when taken in conjunction with the accompanying drawings, wherein:

Figure 1 is a front elevation of the attachment.

Figure 2 is a side elevation of the attachment with parts in section.

Figure 3 is a fragmentary section on the line 3—3 of Figure 2.

Figure 4 is a diagrammatic view illustrating the parts in the position occupied at one end of the stroke.

Figure 5 is a view similar to Figure 4 illustrating the parts in the position occupied at the other end of the stroke.

Figure 6 is a fragmentary side view of the actuating lever and portions connected thereto.

Figure 7 is a diagrammatic perspective view illustrating the driving mechanism for the actuator, the kick-off cam lever being omitted for purposes of clarity.

Figure 8 is an elevational view of the cam means shown in Figure 7.

Figure 9 is a view of the structure shown in Figure 8 taken at right angles thereto and partly in section.

In some cases machine tools such for example as screw machines, are provided with one or more slides such as tool slides, and include actuating means for reciprocating the slide toward and away from a work piece. For certain operations the amplitude of movement of the slide as controlled by the actuator is insufficient. The present invention relates to an attachment which may be provided on the machine tool which will increase the length of stroke of the slide while at the same time preserving the power available to move the slide at predetermined portions of the stroke. It will be appreciated that while the present invention is illustrated in the form of an attachment to be applied to an existing machine tool, the invention is, of course, capable of broader applications and involves structure which may be built into a machine tool or any appropriate structure as original equipment.

The attachment comprises a frame 10 adapted to be secured by a bracket 12 to a permanent part of the machine tool such for example as a bar 14 thereon. The machine tool includes a machine slide in suitable ways provided therefor. In the past, slides of this type have been reciprocated by direct connection to a rack, such as the rack 20 which is herein illustrated as a part of the attachment, but which supplants a similar rack conventionally provided on machine tools. The rack 20 is engaged by a pinion 22 rigidly secured to a shaft 24 which is or may be a part of the machine tool. Means are provided for rotating the shaft 24 and in the unmodified machine tool rotation of the pinion drives the rack and produces a reciprocation of the rack of an amount determined by the angular movement of the shaft 24. In accordance with the present invention, the modified rack illustrated at 20 is provided and as best seen in Figures 4 and 5, the rack carries a toggle device indicated generally at 26 which comprises a lever 28 and a link 30. As illustrated, the lever 28 is pivoted intermediate its ends to the rack 20 by the pivot pin 32, and the lever 28 and link 30 are pivotally interconnected at their ends by a pivot pin 34. The pivot pin 32 in the illustrated embodiment of the invention is intermediate the ends of the lever 28.

The frame 10 is provided with a fixed support 38 having an angularly movable arm 40 pivotally connected thereto adjacent one end of the arm. The other end of the arm is pivotally connected to the other end of the lever 28 as indicated at 42. It will be noted that the pivotal connection between the arm 40 and the support 38, which is indicated at 44, is laterally spaced from the pivot pin 32 which connects the lever 28 to the actuator.

At its lower end, the link 30 is provided with a pin 46 extending into a portion of an adaptor or slide block 48 reciprocable in vertical ways 50 provided in the frame 10. As best seen in Figure 3, the slide block 48 has a recess 52 for the reception of the upwardly extending end 54 of a tool T, in this instance a thread rolling fixture. Accordingly, vertical movement of the slide block 48 results in equal vertical movement of the tool T. Any suitable means may be provided to clamp the end 54 of the tool in the recess 52.

While the lower end of the link 30 is constrained to move in a vertical path by virtue of its connection to the slide block 48, preferably the lower end of the link, as best seen in Figure 2, is provided with a short tubular extension 60 which extends into a vertical slot 62 provided in the frame 10. This constitutes a guide for the lower end of the link.

At the upper end of the rack 20 there is provided a bracket 64 having an overhanging end portion 66 carrying an adjustable screw eye 68 to which is secured one end of a tension spring 70 (see Figure 2). The lower end of the tension spring 70 is connected to a plate 72 bolted or otherwise secured to an upstanding portion of the slide block 48, thus partially counterbalancing the weight of the slide block and the associated mechanism.

The operation of the structure thus described is believed apparent, but certain advantages obtained will be pointed out. It will be observed that during initial upward movement of the rack 20 substantially no rocking movement of the toggle device consisting of lever 28 and link 30 takes place since at this time the pivoted upper end of the lever 28 is moving in substantially a vertical direction. As a matter of fact, the pivoted upper end portion of lever 28 is moving not truly vertically at this time but slightly at an angle to the vertical away from the pivot point 44 to maintain the over-center relation of the toggle device. It will be appreciated that this portion of the stroke represents the working portion thereof so that the full power available from movement of the rack 20 is employed in moving the slide. Additional upward movement of the rack causes the arm 40 to swing past a horizontal position with the result that further upward swinging of the arm will cause the lever 28 to be rocked counterclockwise to the position shown in Figure 5, and this will be accompanied by a breaking of the toggle device causing the lower end of link 30, and particularly the coupling pin 46, to move relatively close to the pivot pin 32 which connects lever 28 to the rack 20. It will thus be seen that for a given stroke of the rack 20, the slide is caused to have a substantially greater stroke. Moreover, this stroke is carried out at variable speeds due to the action of the toggle device so that full power is available during the working portion of the stroke.

Referring to Figure 4, it will be observed that near the lower end of the stroke, the lever 28 and link 30 are in over-center relation and bear against an abutment surface 74 on the rack. Accordingly, during downward movement of the rack 20, which corresponds to the working stroke, the toggle device is in over-center relation and becomes a rigid and fixed part of the rack so that movement of the slide block 48 and the tool T connected thereto is accomplished by what is in effect a direction connection to the actuating rack.

Accordingly, the present invention provides means for increasing the length of stroke of a slide member while preserving the full power thereof during the working portion of the stroke.

While in the illustrated embodiment of the invention, the adaptor or slide block 48 is shown as movable in the ways 50 which are a part of the attachment. It will be understood that in some cases the machine tool will have a slideway thereon of sufficient length to mount a slide for the required movement, even though the actuating mechanism does not provide the required length of stroke. In this case the attachment may include only such parts as are necessary to effect the required longer stroke of the slide provided on the machine tool.

In accordance with the present invention, there is provided means for connecting a reciprocable actuator to a longitudinally movable element so as to provide for a stroke of the element substantially greater than the movement of the actuator in such a way as to preserve the full power of the actuator at a required portion of the stroke. This permits adaptation of existing machine tools to different operations and increases the capactiy of a machine tool for certain operations.

Referring now to Figure 7, the driving means for the rack 20 is illustrated diagrammatically. The pinion 22 which drives rack 20 is keyed or otherwise fixed upon a shaft 24 which has a second pinion 82 fixedly secured thereto at a point spaced from the pinion 22. The shaft 24 is journalled for rotation in suitable fixed bearings not shown. A second rack 84 has teeth engageable with the pinion 82 so that reciprocation of the rack 84 relative to pinion 82 will operate to rotate the shaft 24 and hence drive the rack 20 in opposite directions. One end of the rack 84 is pivotally connected to the free end of arm 86 of a bell crank 88 which is pivotally connected to a fixed support 90 by a pin 92 passing through the bell crank at the junction between the arms 86 and 94 thereof. The free end of the bell crank arm 94 has a cam follower 96 in the form of a roller supported thereon for rotation, and the roller is engageable with a cam 98 fixedly mounted upon the drive shaft 100.

This cam 98 is the feeding cam and is designed to move the bell crank in a counterclockwise direction to feed the tool slide in a downward direction or towards the work support. As noted in Figures 8 and 9, the feeding cam 98 has a circularly shaped cam surface 102 which extends for somewhat more than 180° and between the ends of the circularly extending cam surface 102 is the cam feeding portion 104 which appears as a radial projection on the cam.

A second cam termed the kick-off or retracting cam is indicated at 106. This cam 106 is also secured to the shaft 100 against rotation relative thereto. As shown in Figures 8 and 9, the kick-off cam 106 has a threaded connection with the reduced end of shaft 100. Cam 98 is sleeved over the shaft and fastening screws 107 are provided to rigidly secure the cams together.

The mechanism also includes a kick-off cam link 108 which has the upper end pivotally connected to the arm 94 of bell crank 88 at a point intermediate the ends of the arm. As shown, the link 108 has a pivot pin 110 extending therethrough and journaled on the free end of the pivot pin is a connecting block 112. The connecting block, in turn, is rigidly secured to the arm 94 by fasteners 113 to provide a pivotal connection between the arm 94 and the link 108. Pivot pin 110 is retained against axial movement by cotter pin 111 and pin 115.

The lower end of the link 108 has a cam follower 114 which is in the form of a roller positioned for engagement with the kick-off cam 106. The kick-off cam 106 has a circularly extending cam surface 118 which extends for something more than 90° and has the projecting portion 120 extending radially outwardly from the circular portion of the cam and defining a cam surface 122 in continuation of the cam surface 118. Beyond the cam surface 122 is a rather sharply cut surface 124 which extends approximately in tangential relation ot a circle coinciding with the circularly extending cam surface 118. The ends of the surfaces 118 and 124 are connected by the surface 126 which extends roughly diametrically of a circle coincident with the circularly extending cam surface 118.

It will be noted that the kick-off cam 106 has an axially extending hub portion 128 and a bearing 130 sleeved on the hub provides a sliding pivotal support for the link 108 which will be seen to have a longitudinally extending slot 132 slidably and pivotally supported on this bearing. The slot is open at one side of the link to facilitate assembly. A washer 134 is held on the hub 128 by a cotter pin 136 to retain the lever on the hub.

The operation of the drive will now be described. Assuming a clockwise rotation of the shaft 100, the follower 96 will initially ride along the circularly extending cam surface 102 and will then ride up on the generally radially extending inclined cam surface 140 of projection 104. During this time, the tool slide is fed rapidly toward the work piece support 150 for the round work piece 152 (Fig. 2) upon which threads are to be rolled. Further advance of the tool slide toward the work piece is controlled by the cam surface 142 which provides a much more gradual advance of the tool slide and which controls such advance during the actual engagement of the thread forming rolls with the work piece and the formation of the threads. At precisely the instant that the roller 96 leaves the high point 144 of cam surface 142, the cam follower 114 reaches the junction between the surfaces 118 and 122 of the kick-off cam. Accordingly, at precisely the termination of the forward advance of the tool slide, the retraction of the tool slide is immediately and positively initiated so that the forming rolls will be withdrawn from the work piece at the instant the pressure of forward advance is terminated. Accordingly, there will be no danger of slipping between the thread forming rolls and the rotating work piece.

Machines of this type ordinarily have spring-type retracting means for returning the tool slide, this in addition to the counterbalancing spring 70. However, such retracting means are not capable of immediately and positively retracting the slide at the instant the forward advance is ended, and hence the need for the present invention. Such spring-type retracting means or other conventional retracting devices may, of course, be employed in conjunction with the structure herein disclosed. The kick-off cam need then merely control the initial retracting movement of the tool slide sufficient to completely separate the thread forming rolls from the work piece and further retraction of the slide can be controlled by the conventional retracting means. In the present instance the kick-off cam 106 is designed to be used in conjunction with conventional retracting means.

The drawings and the foregoing specification constitute a description of the improved slide in such full, clear, concise and exact terms as to enable any person skilled in the art to practice the invention, the scope of which is indicated by the appended claims.

What I claim as my invention is:

1. Apparatus for increasing the stroke of a machine slide while retaining the power during the working portion of the stroke comprising an actuator having a short predetermined stroke, a toggle device comprising a lever and a link having the adjacent ends pivotally connected together, means pivotally connecting said lever to said actuator at a point intermediate the ends of said lever, a slide movable parallel to said actuator, means pivotally connecting the other end of said link to said slide, and means for breaking said toggle device during movement of said actuator in one direction and for straightening said toggle device during movement of said actuator in the other direction to cause movement of said slide in excess of said actuator, said last-mentioned means including an arm having one end pivotally connected to the other end of said lever, a fixed support, and means pivotally connecting the other end of said arm to said fixed support for swinging movement about an axis spaced laterally from the pivotal connection between said actuator and lever.

2. Apparatus as defined in claim 1 in which said last-mentioned means is effective to straighten said toggle device to slightly over-center position during the completion of the movement of said actuator in the said other direction so that said slide moves at the same speed as said actuator, and an abutment on said actuator engaged by said toggle device when in over-center position to provide a rigid connection between said actuator and said tool slide.

References Cited in the file of this patent

UNITED STATES PATENTS

| | | |
|---|---|---|
| 629,039 | Luitwieler | July 18, 1899 |
| 654,643 | Johnson | July 31, 1900 |
| 1,050,226 | Nixon | Jan. 14, 1913 |
| 1,145,661 | Bailey | July 6, 1915 |
| 1,172,214 | Kaufman | Feb. 15, 1916 |
| 1,865,198 | Marsilius | June 28, 1932 |
| 1,980,527 | Hewton | Nov. 13, 1934 |
| 2,165,985 | Schwentler | July 11, 1939 |
| 2,720,801 | Erdelyi | Oct. 18, 1955 |
| 2,790,325 | Bedker | Apr. 30, 1957 |